United States Patent [19]
Whittaker et al.

[11] Patent Number: 6,070,166
[45] Date of Patent: May 30, 2000

[54] APPARATUS AND METHOD FOR COMPRESSING A PLURALITY OF CONTIGUOUS ADDRESSES TO FORM A COMPRESSED BLOCK ADDRESS USING THE FIRST ADDRESS OF THE CONTIGUOUS ADDRESSES AND A BLOCK IDENTIFIER BIT

[75] Inventors: Bruce E. Whittaker, Mission Viejo; Donald M. Kalish, Laguna Niguel; Saul Barajas, Mission Viejo, all of Calif.

[73] Assignee: Unisys Corporation, Blue Bell, Pa.

[21] Appl. No.: 08/999,857

[22] Filed: Jun. 10, 1997

Related U.S. Application Data

[62] Division of application No. 08/092,433, Jul. 15, 1993, Pat. No. 5,642,486.

[51] Int. Cl.$^7$ ...................................................... G06F 7/00
[52] U.S. Cl. ........................ 707/101; 382/232; 345/403; 711/218; 711/219
[58] Field of Search ..................................... 711/141, 144, 711/145, 146, 5, 168, 173, 219, 218; 710/39; 707/101; 382/232; 348/403

[56] References Cited

U.S. PATENT DOCUMENTS

| | | | |
|---|---|---|---|
| 4,602,333 | 7/1986 | Komori | 382/131 |
| 5,339,399 | 8/1994 | Lee et al. | 711/146 |
| 5,398,325 | 3/1995 | Chang et al. | 711/3 |

*Primary Examiner*—Hiep T. Nguyen
*Attorney, Agent, or Firm*—Rocco L. Adornato; Mark T. Starr; Steven B. Samuels

[57] ABSTRACT

A method for compressing a plurality of contiguous addresses for storage in a queue. The method includes recognizing that a first address of the plurality of addresses is an individual address that corresponds to a memory location that is transferred individually. A first value of a block identifier bit is associated with the first address, with the first value identifying the first address as an individual address. The first address and the first value of the block identifier bit are stored into the queue. A further address of the plurality of addresses is recognized as a block address corresponding to a plurality of contiguous data words that reside at a respective plurality of contiguous addresses, that begin with the further address, and that are transferred as a block unit. A second value of the block identifier bit is associated with the further address, the second value identifying the further address as a block address. The second value of the block identifier bit and only the further address of the plurality of contiguous addresses are stored into the queue, thereby compressing the plurality of addresses stored in the queue.

10 Claims, 6 Drawing Sheets

APPARATUS AND METHOD FOR COMPRESSING A PLURALITY OF CONTIGUOUS ADDRESSES TO FORM A COMPRESSED BLOCK ADDRESS USING THE FIRST ADDRESS OF THE CONTIGUOUS ADDRESSES AND A BLOCK IDENTIFIER BIT

This is a Division of U.S. Ser. No. 08/092,433 filed Jul. 15, 1993 to issue Jun. 24, 1997 as U.S. Pat. No. 5,642,486.

This invention relates to data processing systems, and especially to a high efficiency invalidation queue structure for cache memory therein.

BACKGROUND, FEATURES

In a computer system having more than one memory storage facility, a special data integrity challenge can occur. Any computer system having both a main-memory structure and cache-memory(s) is in such a situation (e.g. see System I in FIG. 1, having Main Memory linked by system bus means to a number of Processors, 1,2, . . . N, each with an associated Cache Memory). The potential problem that should be faced is that of maintaining "data coherency," i.e., assuring that all copies of information (data) are identical for a given specific address (in all memory facilities - - - a "data integrity" problem.

If computer processors only read data from the memories, this problem would never occur, but, then, little productive work would take place either. Real processors must also modify the values of data that is stored in the system's memories. This is usually referred to as writing memory, or as doing an "overwrite" operation. Some systems provide for several types of write operations. No matter what varieties of write operations are used, the central problem of data coherency arises any time data in one of several memory facilities has been modified.

Most computer systems with cache memories maintain data integrity using an "Invalidation" scheme. This technique requires each cache-memory module to monitor (or spy-upon) the memory operations of all other processors in the system. When any memory "data write" operation is detected, then each of the cache-memories must plan for a potential invalidation operation within its own cache memory. Invalidation operation entails checking the contents of (its own) cache memory for the specific address of the write operation that was detected. If a local cache-memory module discovers that it indeed does contain this (same) address, it must then mark this address as no longer valid, since some other processor is overwriting its previous value.

This invalidation process, itself, presents a problem for the cache memory module and its associated processor, since it uses of cache memory resources. These resources are, of course, present to assist the processor in its work, but the invalidation process may make them "busy" and so hinder the processor from getting its regular work done.

It would be desirable therefore to remember the information necessary for a specific invalidation and execute the process at the least inconvenient time - - - such is an object hereof.

A second motivation for some sort of remembering device for invalidation data is that the "spying," or monitoring of bus activity, may involve numerous write conditions, and doing so very quickly lest one delay other processors in the system. Therefore, each spy, or cache, must remember all the possible invalidation information for execution at some later time. This we also propose here.

Such a novel "remembering mechanism," is described here - - - and, for the sake of this discussion, it is called an "INVALIDATION QUEUE" (IQ). The IQ queue structure must take-in, and hold, all pertinent information regarding all memory write operations in the system. It must then provide for the convenient unloading of this information for the invalidation process at the discretion of the local cache-memory module.

This disclosure presents such an INVALIDATION QUEUE structure; along with several special related features to greater facilitate the efficient handling of invalidation information at the least cost in overall performance of the computer system.

Thus, an object hereof is to address at least some of the foregoing problems and to provide at least some of the mentioned, and other, advantages.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements:

FIG. 5 is a functional showing of a like Queue (a "Spy Queue"); while

OVERVIEW OF INVENTION

Our "invalidation queue" mechanism is called-upon since write operations can occur on the system buses faster than the cache invalidation processes can be executed (without the queuing mechanism.)

Figure 2:
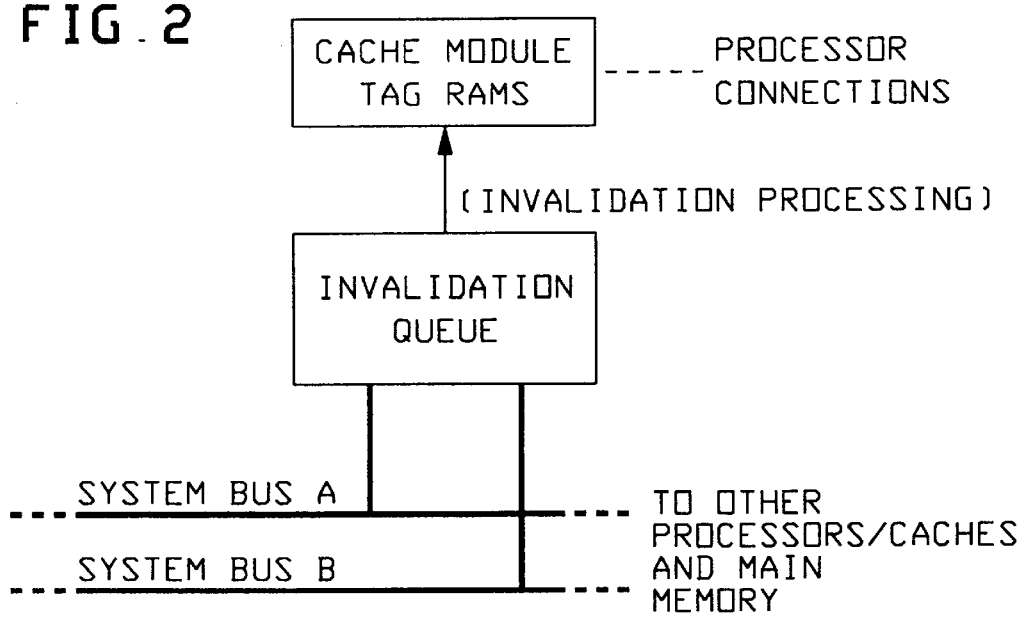
FIG. 2 is a block diagram of an Invalidation Queue made part of a cache like those in FIG. 1.

Our "Invalidation Queue" IQ structure provides a path between (i.e. couples) a pair of main system buses (here, denoted as busses A and B) and cache memory module tag RAM resources, CM-RAM (FIG. 2 shows this). Of course, systems with two or more buses will be more fault-tolerant (e.g. redundancy), easier to maintain and to "split".

Figure 1:
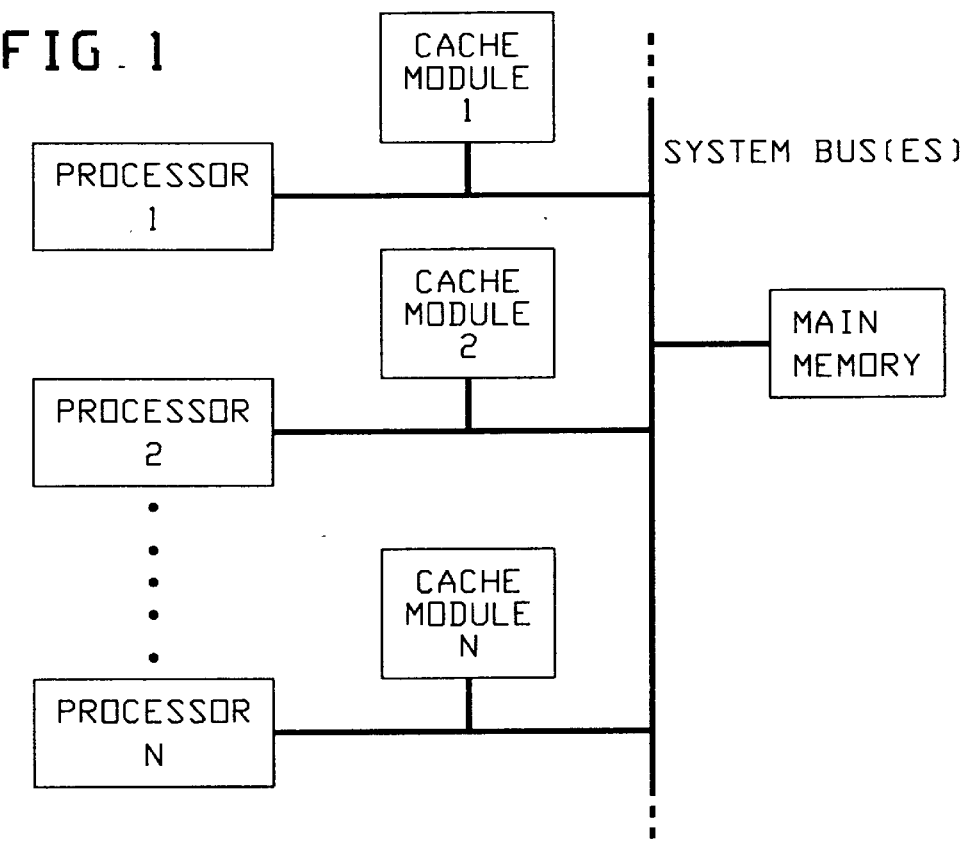
FIG. 1 a propaedeutic showing of a multi-memory, multi-processor computer system.
Figure 3:
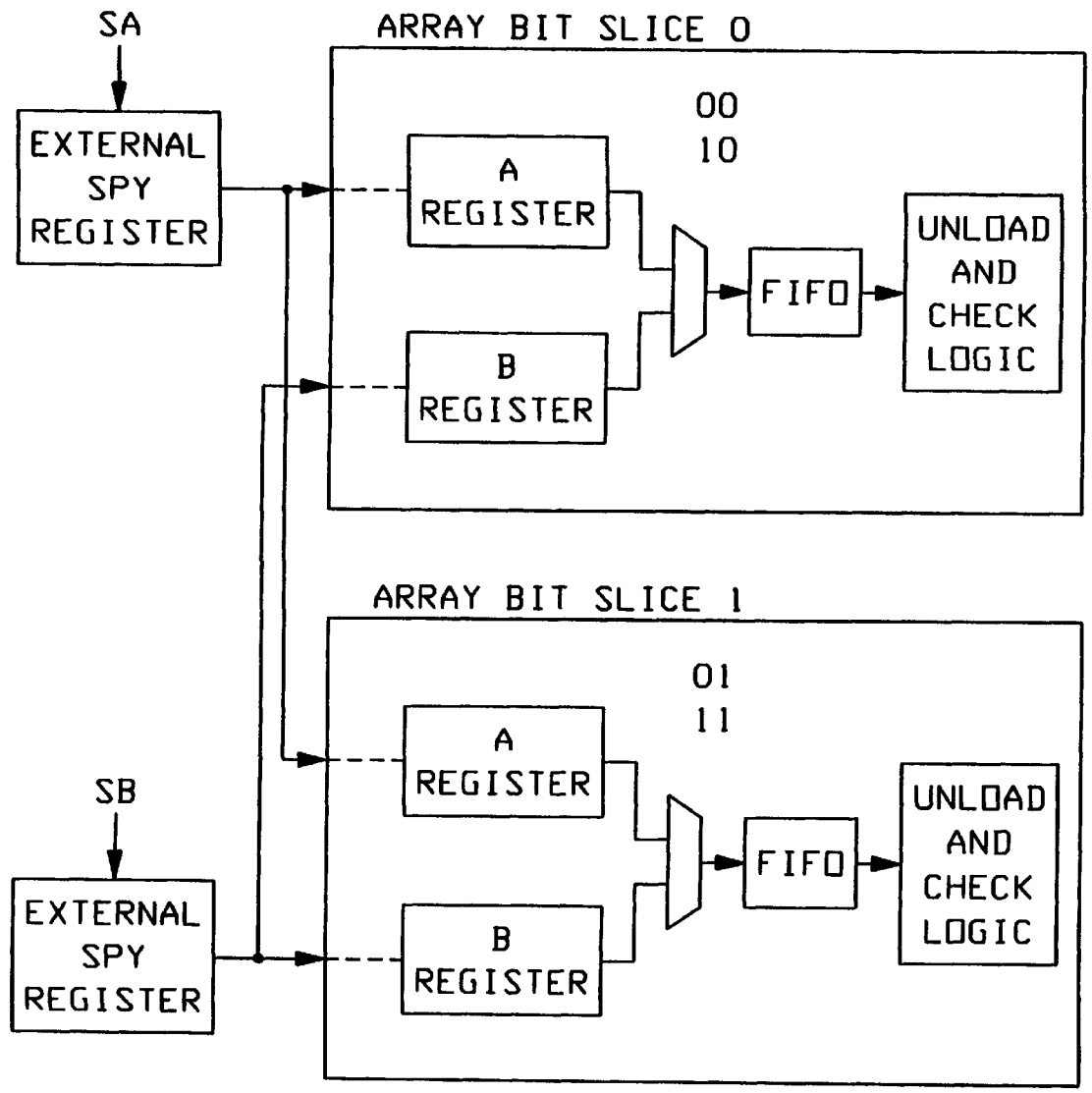
FIG. 3 is a more detailed diagram of such a Queue made according to a preferred "bit-sliced" embodiment hereof; with FIG. 3A further detailing one of the two "slices" thereof.

FIG. 2 is a block diagram of an Invalidation Queue, etc., as mentioned for inclusion in a Cache Memory module as shown in FIG. 1. FIG. 3 shows a more detailed description of a preferred "Invalidation Queue" implementation in block diagram form. Here, it is seen that information SA, SB from incoming write operations on each system bus, (SA on bus A, SB on bus B) must first be captured in a respective "External Spy Register" ESR-A, ESR-B one for each bus. These provide two important features:

First, the information on a respective system bus must be captured in a very fast register which is located very close to the bus connection - - - to meet bus timing restraints.

Secondly, the clock (frequencies) of the system buses and the cache module are asynchronous (i.e. not synchronous with one another), hence, the "External Spy Register" on each bus will preferably provide clock synchronization as well (preferably via a separate PAL).

FIG. 3 also shows that the remainder of the "Invalidation Queue" structure as implemented within two large ASIC gate arrays A-0, A-1. In fact, most of the cache module is also preferably implemented in these arrays. [Prefer MOS-type ASIC] To provide a sufficiently large cache memory module (to give the required processor performance), we "split" the cache module and its "Invalidation Queue" between the two ASIC arrays, structuring them in a "bit-sliced" method. That is, one-half of the "slice" (one array) handles one-half of the possible memory addresses (e.g. A-0). The second "slice" (the other array) handles the other half of the addresses (e.g. A-1).

Each of the bit slices (cache arrays) must "spy upon" both of the system buses, A and B. Therefore, each of the cache arrays (bit slices) receives the outputs from both of the "External Spy Registers" - - - described above. As FIG. 3 then shows, these inputs are then held in respective holding registers, called "A-Register" and "B-Register" in each ASIC array. When the appropriate register in the appropriate ASIC array is loaded from the appropriate "External Spy Register," ESR, then that ESR is free to continue its task of monitoring its system bus.

The "A-Register" and "B-Register" are then steered to a "First-in, First-out" (FIFO) queue structure of the "Invalidation Queue" structure. Once the FIFO is loaded with the bus write information, that register is also freed for new incoming information. Thus, we have a "pipe-lining" structure: with "External Spy Registers" feeding the specific "n-Registers" for the appropriate bus and array. These, in turn, feed the appropriate FIFO.

The "pipe-lining" plus the "bit-slicing" allows the "Invalidation Queue" to handle two high-speed system buses without degrading (slowing down) performance of a system bus, and without "losing" an invalidation operation (no invalidation performed).

SIZE OF THE INVALIDATION QUEUE

The queue must be wide enough to hold all information needed for a write operation on the buses. It must be deep enough to hold sufficient "writes" and so minimize the effect of invalidation on processor work, while assuring that no "writes" will be lost.

If the queue depth is made too small (i.e. not enough "writes" are held), then it will fill up too quickly. When the queue becomes full, invalidation executions become mandatory and normal processor-work must cease until the invalidation work is done and the queue is no longer full. Also when the queue becomes full, there is increased danger of losing a "write" on the system bus. Such a situation is catastrophic to the system (data coherency is lost).

Another consequence of "queue full" is that each time a new "write" is detected on either system bus, it must be "retried" (i.e. repeated later) since there is no room in the queue. This means that the source module of that write operation has to repeat the entire operation at some later time, hoping that by then the queue will have room for the new invalidation. The "retrying" mechanism can significantly slow down data flow on the buses. It can, in fact, be so detrimental that no other useful work can proceed meanwhile.

It could be argued that the queue can be made "very deep" to prevent such conditions. However, too deep a queue is also undesirable since queue structures are expensive, both in hardware cost and in chip space ("real estate"). Also, the deeper a queue, the more extensive and complicated becomes its supporting control logic.

It is therefore highly desirable that queue storage be correctly sized and be used very efficiently.

The queue mechanism presented herein uses a "data-compression" scheme to allow more effective address information to be held in queue hardware that is down-sized.

"ADDRESS COMPRESSION" FEATURE

Figure 4:
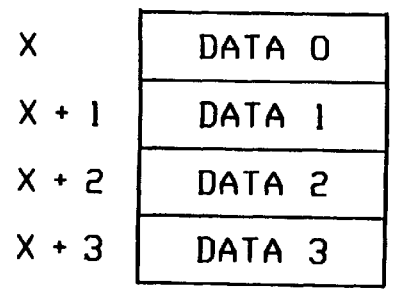
FIG. 4 is a functional representation of data blocks (addresses) for such a Queue.

FIG. 4 will be understood to indicate that many of the system bus write operations involve "blocks" of data information. That is, each address (e.g. x) actually represents four data words (a block x, x+1, x+2, x+3) in memory. The Input/Output (I/O) subsystem especially fills memory from I/O peripheral devices using "memory block" type of write operations. Note, in the Unisys A-11 computer system this operation is called a "New Data Overwrite" (NDOW), and it always presents such a four word block of data for each address.

Figure 5:
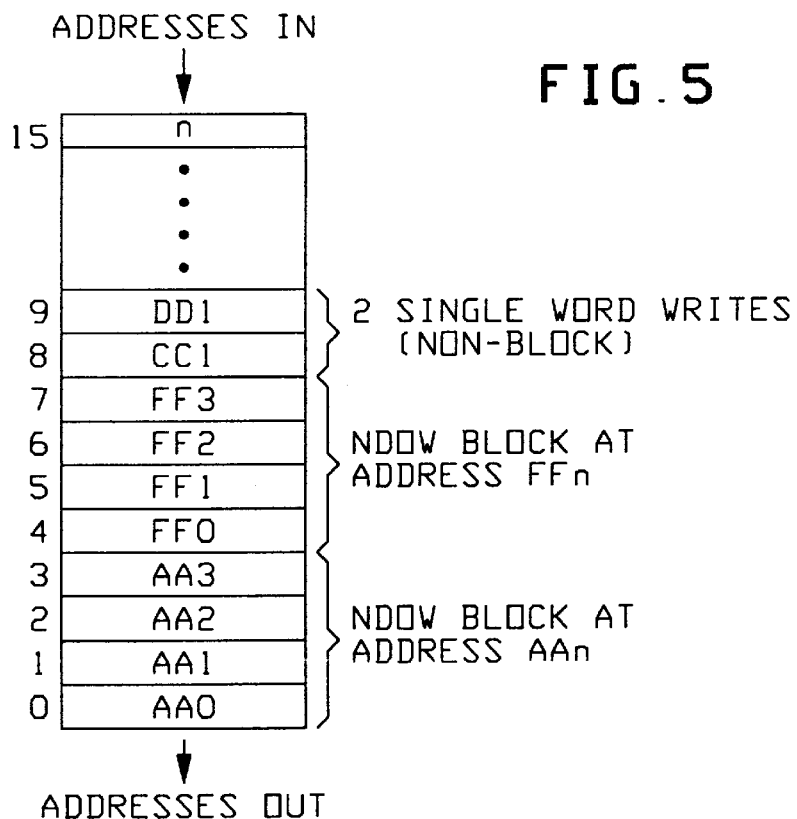

FIG. 5 shows a spy queue without our Address-Compression (data compression) feature. Here, only four (4) system bus operations have occurred and yet 10 of the 16 positions in the queue have been filled. FIG. 5 shows that two "block type" writes (NDOW) have occurred, followed by two single word type writes.

Since a block type operation does represent four real addresses in memory, all four of these addresses must be checked (spy'd upon) in each cache module. Therefore, without our data compression feature, all four of these addresses must be placed in the "invalidation queue" to be checked.

Figure 6:
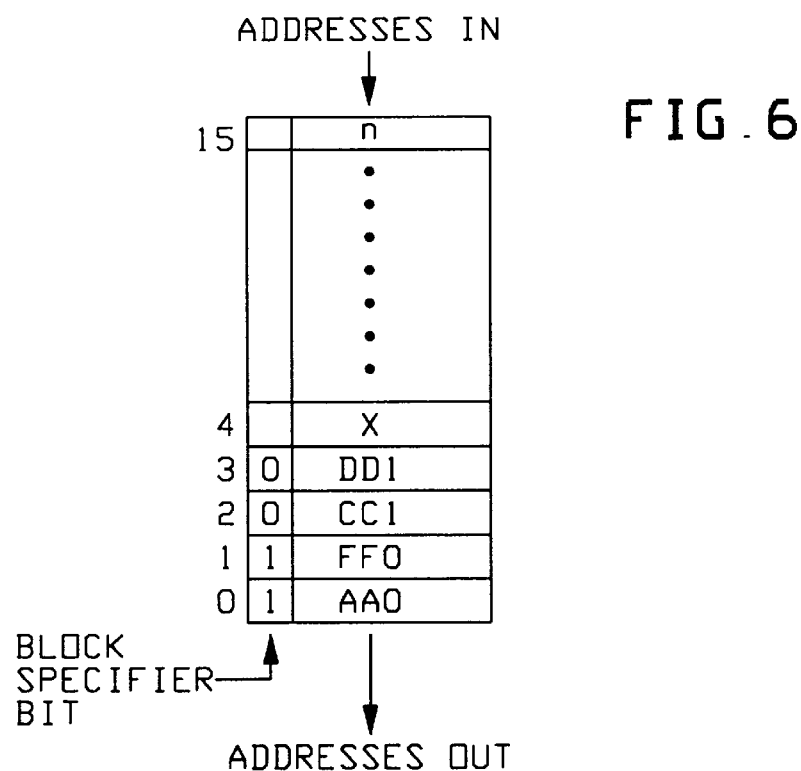
FIG. 6 shows the same as modified by Address Compression as here contemplated.

FIG. 6 shows the same sample system bus operation sequence, but using the Address-Compression feature of this invention. Here a special bit, called the "Block Specifier," (BS-bit) is used within the queue to indicate whether the address given is a single word or a block type. In this sample sequence, it will be understood that our data compression method uses only four queue locations, as opposed to ten (10) locations used more conventionally (e.g. as in FIG. 5). This feature greatly helps prevent the queue structure going to a "Full" condition too quickly.

The compressed data format in the queue saves room in the queue storage; however, it does require extra effort when the address (the compressed address) is unloaded from the queue to check against the cache TAG RAM.

Figure 3A:
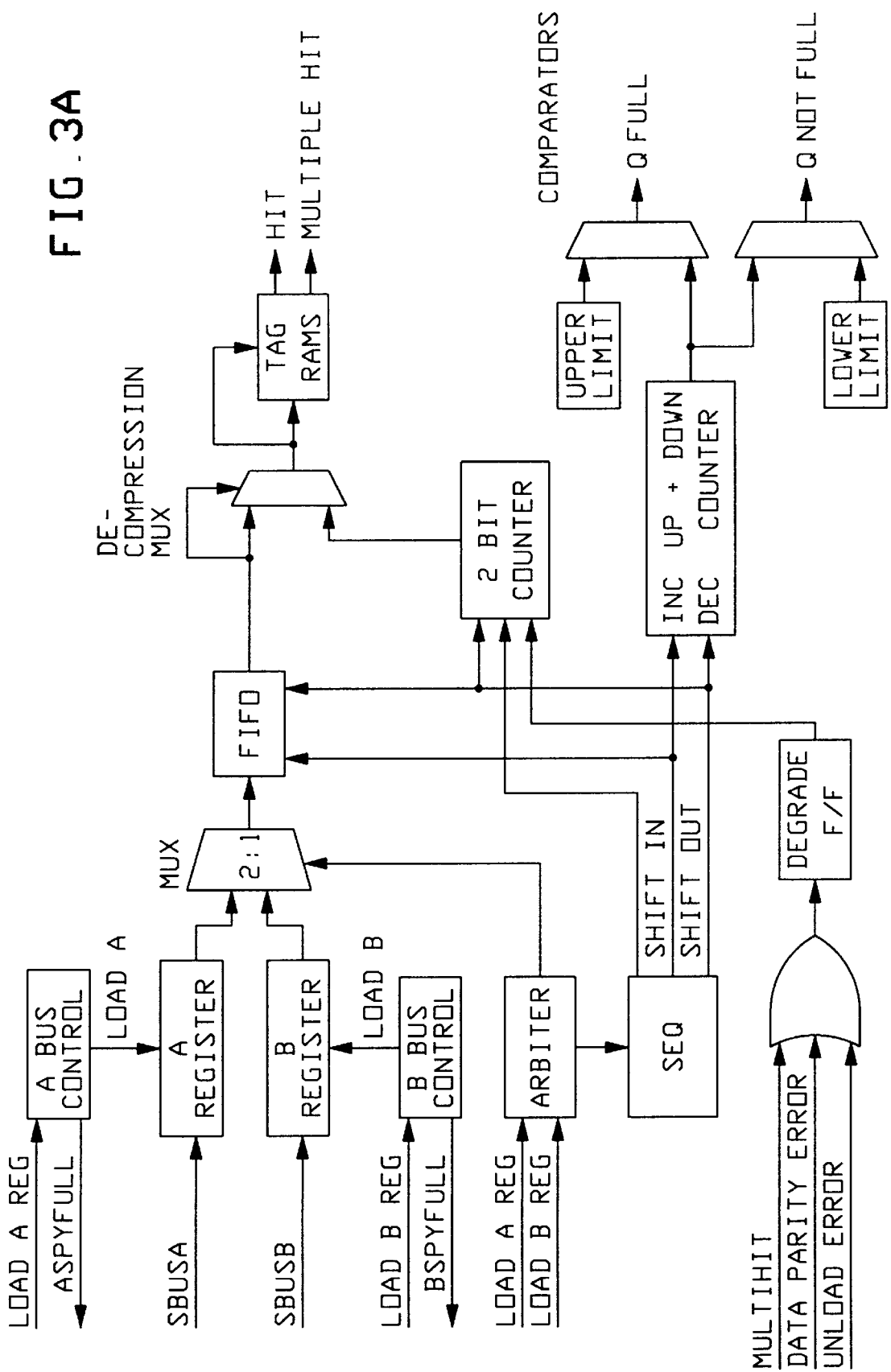
Figure 7:
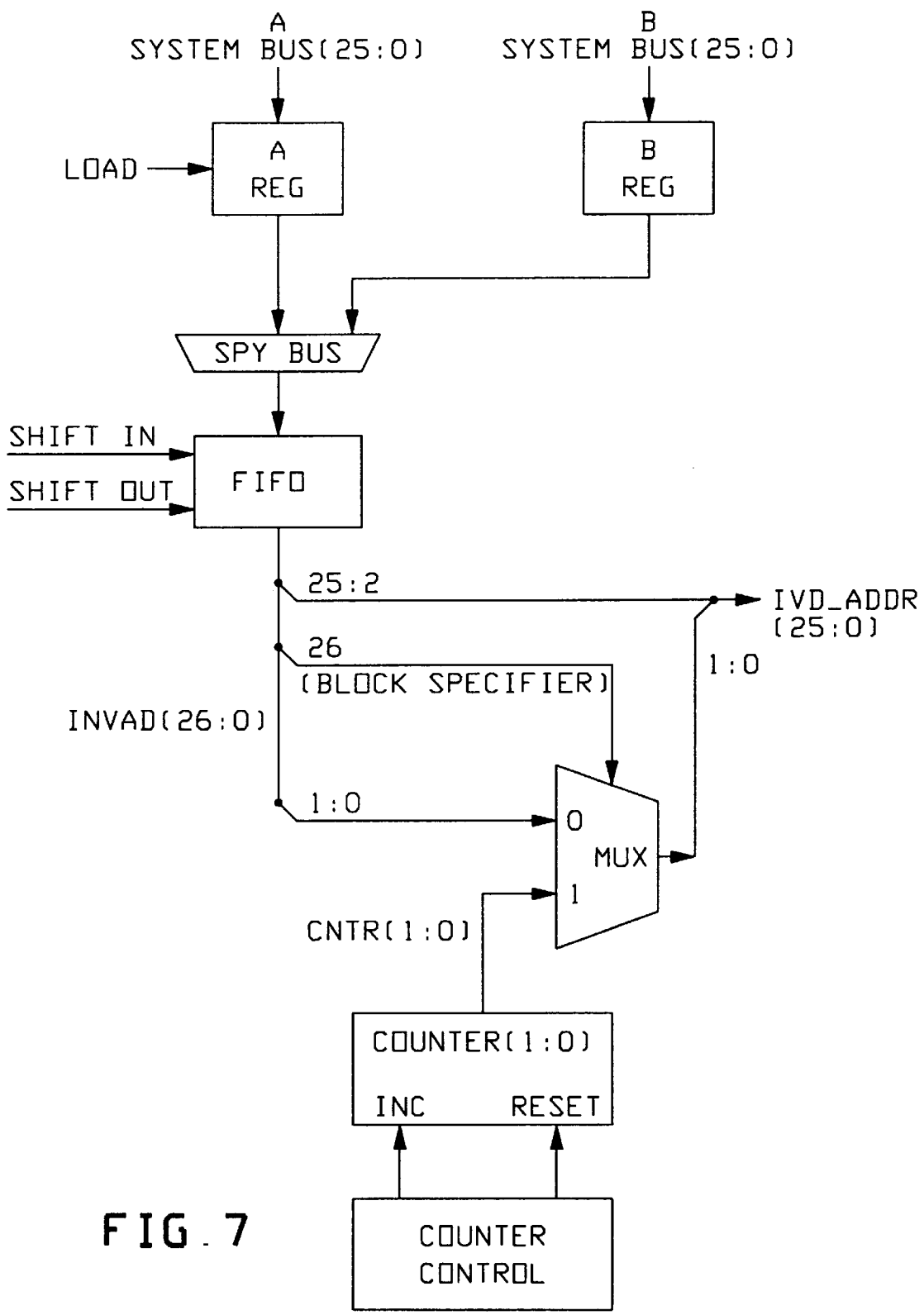
FIG. 7 is a block diagram of the "unload side" of such an Invalidation Queue FIFO; while FIG. 8 indicates Invalidation Address Mux selection.

FIG. 7 shows the unload side of the "Invalidation Queue" FIFO. Here, it should be understood that the 26 bit invalidation address, IVD_ADDR(25:0), is derived from the information stored within the FIFO, and from an associated 2-bit counter. Bits (25:2) of the address remain the same whether for a "single word" type address or for a "block" type address. However, the lower two bits of the invalidation address differ depending upon the value of the "Block Specifier" (bit position 26 in FIG. 7). FIG. 3A is a related showing of an ASIC for one "Queue half".

[modified to include Spy-bus etc.; counter, etc., as in FIG. 7, plus Degrad F/F, etc.].

A multiplexor (MUX) selects the lower two bits for the invalidation address. If the "Block Selector" is a zero (a "single word" type), then the entire address, including the lower two bits, comes out of the FIFO. If a "compressed" address emerges from the FIFO, (that is the "Block Selector" is a value of "one"), the lower two bits are derived from the counter.

Thus, a single position within the queue storage FIFO can give one of four values for the "Invalidation Address" when taken from the FIFO.

"BIT-SLICE" FEATURE

Referring back to FIG. 3, it can be seen that the cache module, including the "Invalidation Queue" structure under discussion, is preferably implemented using two ASIC gate arrays A-1, A-0. The arrays are identical and comprise two-halves of a complementary "bit-slice" structure. That is, one array handles one-half of the cache work, and the second array handles the other half. Each array processes ONLY certain "ID" bits that are configured at system initialization time. One array "passes" only data whose ID=0 (A-0); the other array only data whose ID=1 (A-1).

The "bit-sliced" array handling ID=0 (A-0) will handle all cache operations including invalidations with the least significant address bit=0. The other array (A-1, for ID=1) will handle all cache work where the least significant address bit is "one".

With reference to FIG. 7 and the "compressed address" feature of our subject "Invalidation Queue", this "bit slice" feature is also affected. Each of the two arrays, (A-0, A-1, FIG. 3) only uses two of the four block addresses for a "compressed address". Array A-0 (ID=0) will count the lower two address bits as: 00 and 10. While array A-1 (ID=1) will count the lower two address bits as: 01 and 11. It can be seen here that, again, the least significant address bit corresponds with the array ID value.

This "bit slice" feature allows both cache arrays A-0, A-1 to do invalidating work simultaneously. Thus, for a "compressed block" type address, array A-0 handles two address values, while, simultaneously, the other array A-1, handles the other two address values of the block. This feature greatly enhances the efficient processing of invalidation addresses since four addresses can be processed in the time one would normally expect to process only two addresses.

Figure 8:
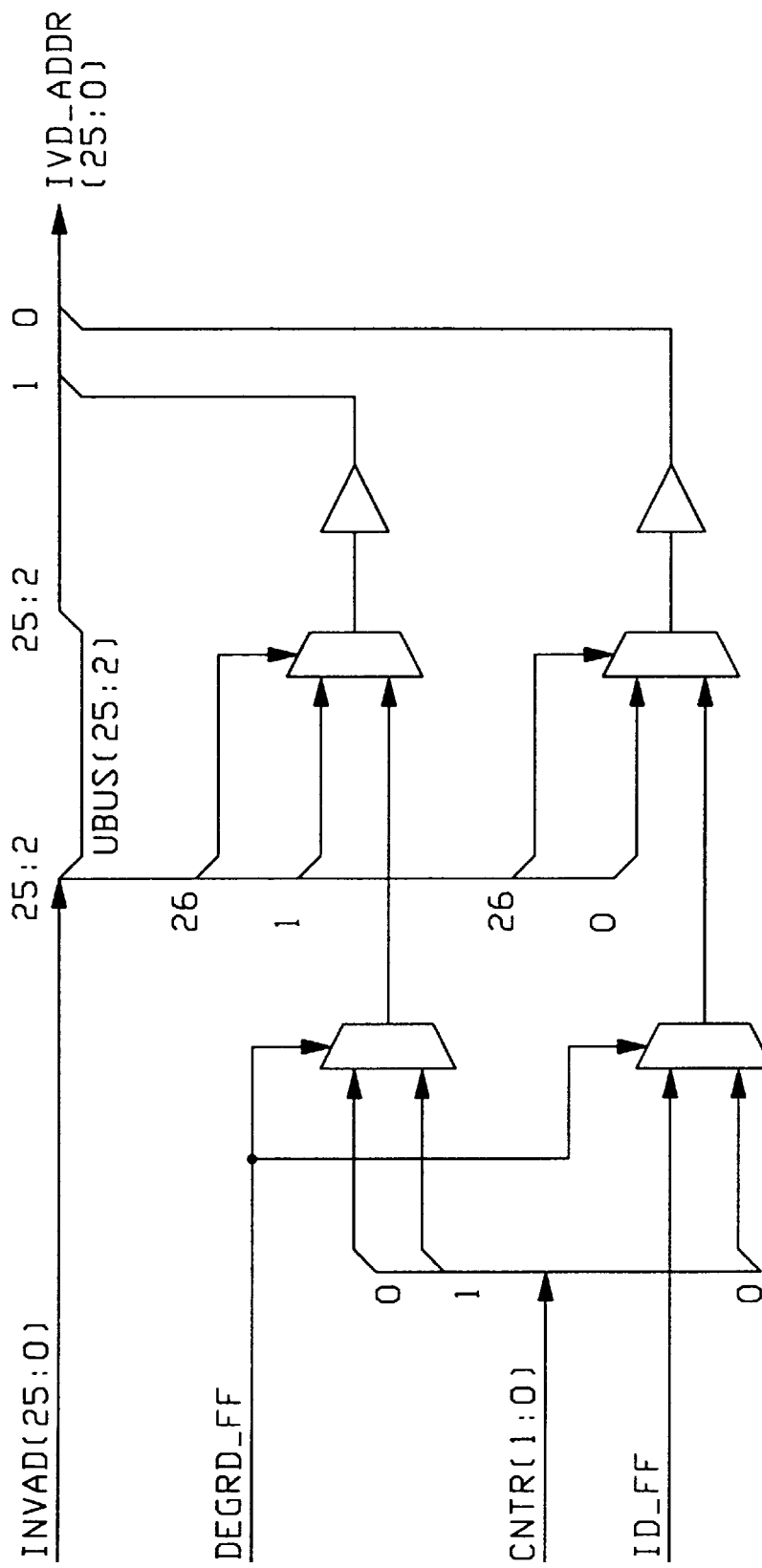

FIG. 8 shows the detailed logic for the multiplexors for the lower two address bits. Here, it will be understood that the invalidation bus from the FIFO, called INVAD(25:0), goes directly to become the actual invalidation address, called IVD_ADDR(25:0), except for the lower two bits which are derived from the multiplexors.

The identification bit for the array is seen here. It is called ID_FF. (A second signal, DEGRD_FF, called "degraded" will be discussed later.)

In normal operational modes (that is, with both arrays functioning normally), "bit-slicing" is fully operational. This is the case when DEGRD_FF is off; and the cache is said to not be "degraded." In this case, the second address bit, IVD_ADDR(1), gets the lowest bit of the counter, CNT(0). The lowest address bit, IVD_ADDR(0), gets the value of the ID_FF. It is seen that this causes each array to process addresses based upon their ID value and upon their least significant bit.

Because of the "bit slice/dual array", character of the cache, we also provide a special feature called "degraded" mode - - - whereby, if one of the arrays A-1, A-0 malfunctions (for example, parity errors detected in the cache tag RAMs), it takes itself off-line and a "degraded flip-flop," DEGRD_FF, (provided in each array) in the other array is set.

When the system is operating in "degraded mode," then there is only a single cache array available to handle all of the necessary cache work. Therefore, this array must handle all possible cache addresses. Hence, it can be seen from FIGS. 7 & 8 that, when DEGRD_FF is set, all four addresses of the compressed address block (00, 01, 10, and 11) must be multiplexed from the counter, CNTR(1:0), to the IVD_ADDR(25:0) lower two bits.

REPRISE

The ability to provide for "invalidation" of both "single word" type and "block type" system bus write operations in our special "Invalidation Queue" structure can greatly facilitate the performance of a processor/cache system.

Our "address compression" feature allows a block of (four) addresses to be held in a single position in the queue storage facility and allows many more operations to occur before the queue can be "filled". Since a "full" queue can degrade system performance, and can hinder a processor from doing other work, this compression feature also enhances system performance.

Our "bit-slice" feature allows a much larger cache to be used, as well as enhancing overall system performance; it allows (two) invalidations to take place simultaneously, (i.e. in two ASIC gate arrays A-1, A-0 forming our novel I.Q.) This feature also allows operations to continue even if a portion of the cache module malfunctions, e.g. via a "degrade mode" feature that allows a single array of the dual bit-slice ASIC pair to handle all the cache work itself.

More generally, this Invalidation Queue structure advantageously establishes (upper/lower) limits for associated indicators QUEUE-FULL, QUEUE-NOT FULL (e.g. developing optimum values as Queue is designed and tested). This allows one to tailor the optimum of such values as the Queue is developed, where this is not possible in design phase.

The invention here disclosed is a very general-purpose, very flexible, design. One that has been used very successfully in providing the cache for the Central Processing Module of the Unisys A-11, 411 processing system.

It will be understood that the preferred embodiments described herein are only exemplary, and that the invention is capable of many modifications and variations in construction, arrangement and use without departing from the spirit of the invention.

Modifications of the invention are possible, for example the means and methods disclosed herein are also applicable to other like computer processor storage contexts, as well as to other related storage systems.

The above examples of possible variations of the present invention are merely illustrative. Accordingly, the present invention is to be considered as including all possible modifications and variations coming within the scope of the invention as defined by the appended claims.

What is claimed is:

1. A method for compressing a plurality of contiguous addresses for storage in a queue, the method comprising the steps of:

recognizing that a first address of the plurality of addresses is an individual address that corresponds to a memory location having data stored therein that is transferred individually;

associating a first value of a block identifier bit with the first address, the first value identifying the first address as an individual address;

storing the first address and the first value of the block identifier bit into the queue;

recognizing that a further address of the plurality of addresses is a block address corresponding to a plurality of contiguous data words that reside at a respective plurality of contiguous addresses, the contiguous data words beginning with a first address, and the contiguous data words being transferred as a block unit;

associating a second value of the block identifier bit with the first address, the second value identifying the first address as a block address; and storing the second value of the block identifier bit and only the first address of the plurality of contiguous addresses into the queue, thereby compressing the plurality of addresses stored in the queue.

2. The method of claim 1, wherein the step of recognizing that a further address is a block address includes recognizing that the further address corresponds to four contiguous data words addressed as a block by the further address and storing only an address of a first one of the four contiguous data words.

3. A method of expanding a compressed block address into a plurality of consecutive output addresses, the method comprising the steps of:

extracting the compressed block address and a block identifier bit from a queue;

providing the compressed block address as a first one of the consecutive output addresses;

incrementing a signal representing at least one of the least significant bits of the compressed block address to provide an incremented signal; and after the incrementing step, deriving a next consecutive address after the compressed block address by appending the incremented signal to a subset of the most significant bits in the compressed block address in response to a value representing the block identifier bit.

4. The method of claim 3, wherein the step of incrementing includes incrementing a signal representing the two least significant bits of the compressed block address.

5. The method of claim 3, further comprising the step of repeating the incrementing and deriving steps for each of the consecutive output addresses.

6. The method of claim 5, wherein the step of repeating includes using the subset of the most significant bits to derive each one of the consecutive output addresses.

7. The method of claim 3, wherein the step of incrementing is performed using a counter circuit.

8. The method of claim 3, wherein the step of deriving is performed using a multiplexor coupled to receive as inputs an output of a counter circuit and at least one signal representing at least one of the least significant bits of the compressed block address, and being responsive to the block identifier bit to select one of the inputs as an output of the multiplexor.

9. Apparatus for expanding a compressed block address into a plurality of output addresses, the apparatus comprising:

a queue including a plurality of storage locations, at least one of the storage locations adapted for storing the compressed block address and a block identifier bit, the compressed block address including at least one significant bit and a plurality of remaining bits;

means for extracting the compressed block address from the queue and providing the remaining bits as a most significant portion of each one of the output addresses;

a counter adapted to produce an output of at least one bit;

a multiplexor coupled to receive as inputs the output of the counter and at least one least significant bit of the compressed block address, and being responsive to the block identifier bit to select one of the inputs as an output, the multiplexer output being routed to provide a least significant portion of a first one of the output addresses; and wherein the counter is adapted to increment to generate at least the least significant bit for at least a next consecutive output address.

10. The apparatus of claim 9, wherein the multiplexer is coupled to receive at least two of the least significant bits of the compressed block address, wherein the counter is adapted to produce an output of at least two bits, and wherein the counter is adapted to generate the least significant two bits for at least four consecutive output addresses.

* * * * *